United States Patent [19]
Tabb

[11] 3,905,597
[45] Sept. 16, 1975

[54] BICYCLE ROLLER SYSTEM

[76] Inventor: Lester M. Tabb, Guinea Rd., Cos Cob, Conn. 06807

[22] Filed: Apr. 12, 1974

[21] Appl. No.: 460,511

[52] U.S. Cl. .................................................. 272/73
[51] Int. Cl.² ................... A63B 69/16; A63B 23/04
[58] Field of Search .......... 272/33 B, 52, 52.5, 53.1, 272/53.2, 57 R, 57 A, 57 D, 60 R, 69, 73, 79 R, DIG. 5; 280/289, 293; 193/35 R, 37; 128/25 R; 35/11

[56] References Cited
UNITED STATES PATENTS

| | | | |
|---|---|---|---|
| 463,862 | 11/1891 | Guignard | 272/73 |
| 581,835 | 5/1897 | Sturgis | 272/73 |
| 602,546 | 4/1898 | Tarver | 272/73 |
| 1,766,089 | 6/1930 | Wood | 272/69 |
| 2,923,391 | 2/1960 | Hewitt, Jr. | 193/35 R |
| 2,937,691 | 5/1960 | Horgan | 272/52 |
| 3,125,341 | 3/1964 | Carrington | 272/73 |
| 3,353,644 | 11/1967 | McNash et al. | 193/37 |
| 3,416,792 | 12/1968 | Morgan et al. | 272/60 R |
| 3,488,049 | 1/1970 | Sasser, Jr. | 272/57 A X |
| 3,686,776 | 8/1972 | Dahl | 35/11 |

FOREIGN PATENTS OR APPLICATIONS

| | | | |
|---|---|---|---|
| 607,313 | 3/1926 | France | 272/73 |
| 767,613 | 2/1957 | United Kingdom | 272/73 |

OTHER PUBLICATIONS

Photocopy of Bicycle and Bicycle Roller Stand, Mar. 6, 1900.

Primary Examiner—Richard J. Apley
Assistant Examiner—R. T. Stouffer
Attorney, Agent, or Firm—Joseph L. Lazaroff

[57] ABSTRACT

A bicycle roller system of the type in which a frame carries rollers arranged to support the wheels of a free-standing bicycle to permit the bicycle to be operated on the rollers in a conventional manner, i.e., with all motive power and lateral balancing of the bicycle being supplied by its operator. In the bicycle roller system disclosed herein, the frame is formed of side rails which mount the rollers and also detachably mount elevated and inwardly slanted platforms located adjacent the pedalling region and positioned to be readily reached by the feet of the bicycle operator when the bicycle is in an upright operating position, to aid the operator in obtaining and maintaining balanced bicycle operation. The side rails further mount an instrument such as a speedometer-odometer coupled through a friction wheel arrangement to the rollers contacting the bicycle wheels, to aid in measuring performance.

17 Claims, 6 Drawing Figures

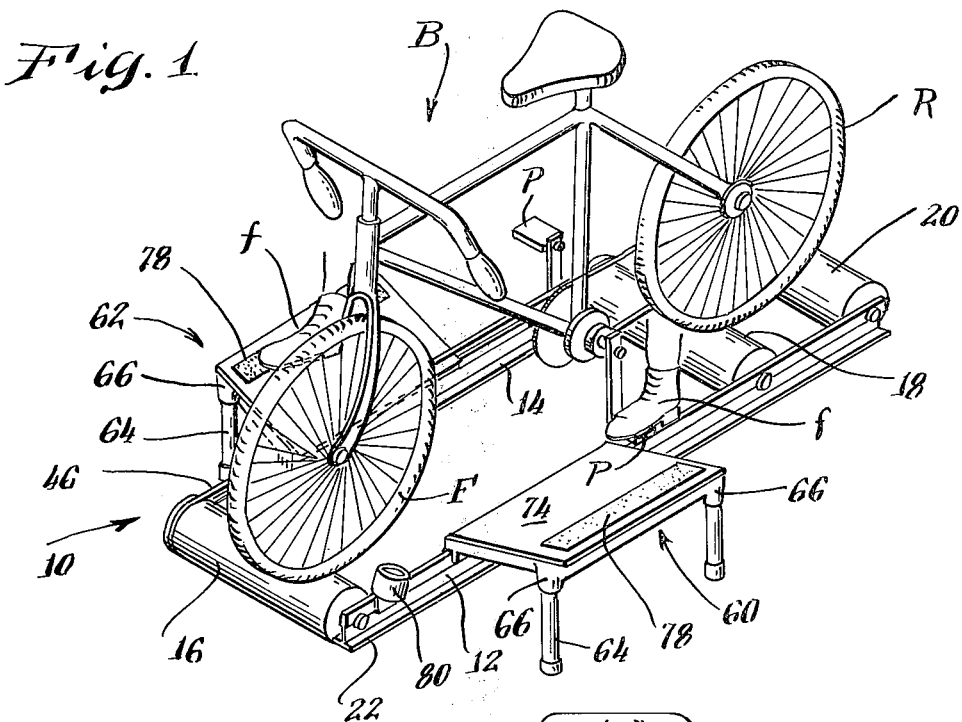
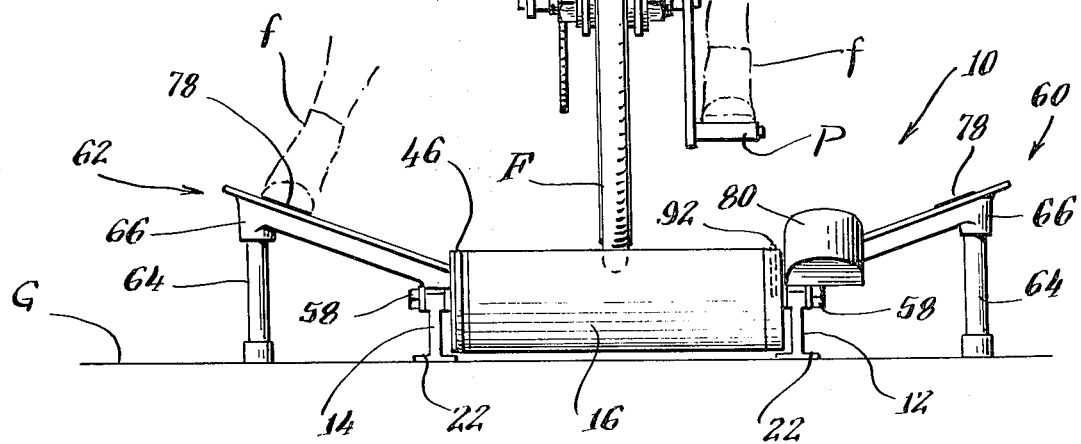

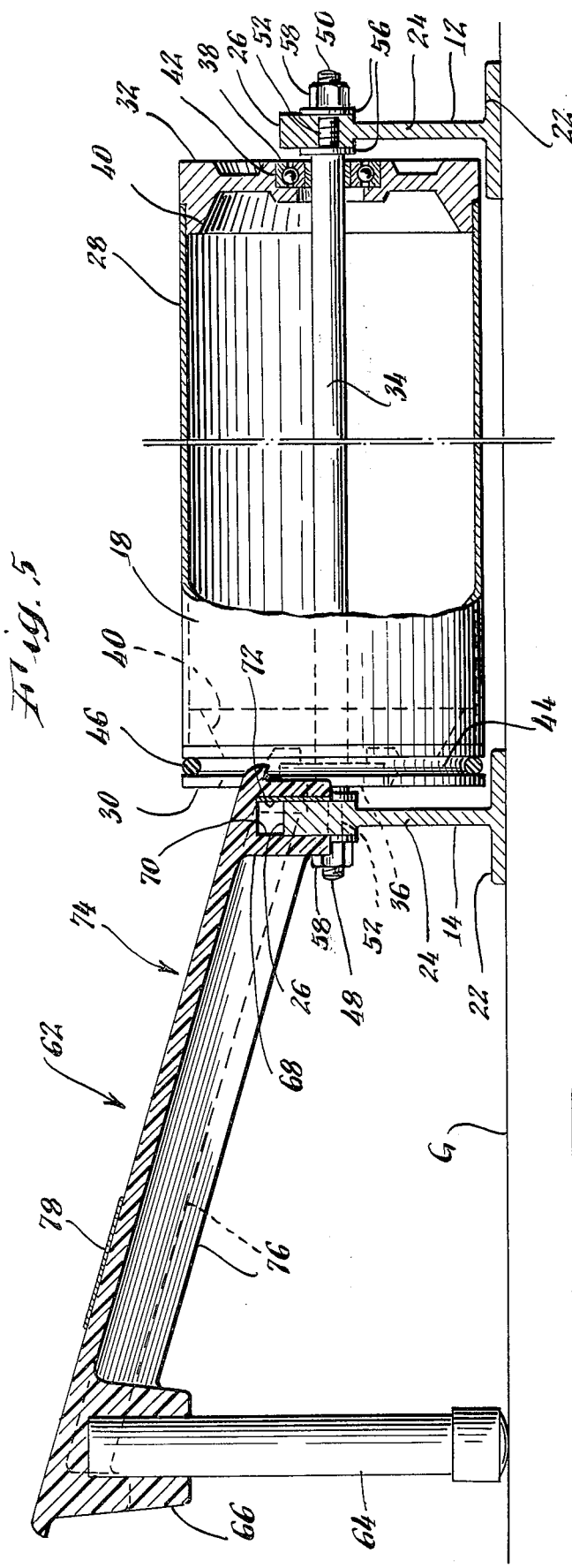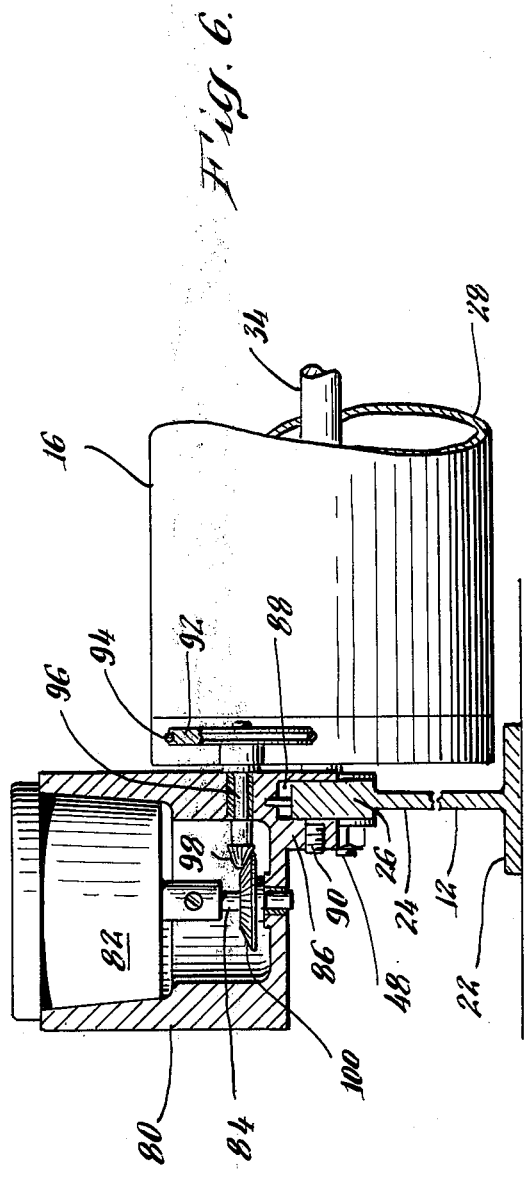

BICYCLE ROLLER SYSTEM

BACKGROUND OF THE INVENTION

1. Field of the Invention

The field of the present invention relates to portable roller devices or systems arranged to support a conventional bicycle for free-standing, self-balanced and self-propelled stationary operation, e.g., indoors during inclement weather or as part of a training or exercise program.

2. Description of the Prior Art

Bicycle roller devices and systems of various types are known. Conventionally, such devices comprise a portable floor-supported frame which mounts several freely turning parallel rollers arranged to support the bicycle wheels. In a typical arrangement, two rear rollers support the driven rear wheel of the bicycle, and a single front roller supports the free front wheel. A belt coupling between a rear roller and the front roller causes the bicycle front wheel to be rotated at the same rate as the driven rear wheel.

Although such known portable bicycle roller devices permit free-standing, self-balanced stationary operation to take place, they have not been fully satisfactory. A stationary bicycle has only the gyroscopic inertia developed by its rotating wheels, and hence lateral balancing during operation on the rollers is more difficult than during forward motion. Balancing is particularly difficult when operation is started, to the degree that the operator usually requires another's assistance to support the bicycle until some stabilizing inertia is developed. During operation, balance can be more readily lost, with a consequent qreater risk of falling and a need for continuously available assistance for restarting. After operation, assistance is sometimes again required for dismounting. The balancing problem, besides requiring assistance for operation, generally also demands a training or learning period before the rollers can be successfully mastered. All of these problems discourage the use of known bicycle roller devices and curtail their obvious benefits in affording exercise and training. In addition, the known devices have no means readily adaptable for measuring performance, and therefore the use of the rollers as part of a regulated exercise or training program is limited.

SUMMARY OF THE INVENTION

The principal object of the present invention is to provide a bicycle roller system which is easy to use. Other objects are to provide a bicycle roller system which is capable of unassisted and safe use, which is easy to learn to use, which is portable, and which affords performance measurement. Still another object of the invention is to provide a bicycle roller system which is suitable for commercial production.

In accordance with the present invention, the bicycle roller system is of the type in which a frame carries rollers arranged to support the wheels of a free-standing bicycle to permit the bicycle to be operated in a self-balanced, self-propelled manner thereon. The bicycle roller system is characterized by side platforms mounted upon either side of the frame and presenting elevated and preferably inwardly-slanted upper surfaces adjacent the pedalling region and positioned to be readily reached by the feet of the bicycle operator when the bicycle is in an upright operating position, thereby aiding the operator in obtaining and maintaining balanced bicycle operation without another's assistance. With use of the slanted elevated side platforms, the operator not only can provide good initial balance, but also can easily correct imbalance during operation, and dismount easily. The aid to balance afforded by the platforms also hastens the process of learning how to use the rollers, and enhances their enjoyment and benefit.

In further aspects of the invention, the frame comprises floor-supported side rails to which the inner edge of the side platforms are detachably mounted by means of a press-fitted arrangement. In addition, the side rails mount a speedometer-odometer housing, and the speedometer-odometer is coupled to the rollers through a friction wheel arrangement to permit measurement of the speed and distance travelled by the bicycle.

Other objects, aspects and advantages of the invention will be pointed out in, or apparent from, the following detailed description of a preferred embodiment of the bicycle roller system, considered together with the following drawings.

DESCRIPTION OF THE DRAWINGS

FIG. 1 is a perspective view of a bicycle roller system constructed according to the invention and illustrated with a bicycle positioned for use thereon;

FIG. 2 is an enlarged scale front view of the bicycle roller system of FIG. 1;

FIGS. 4 and 5 are sections on lines 4—4 and 5—5, respectively, of FIG. 3; and

FIG. 6 is a section on line 6—6 of FIG. 4.

DESCRIPTION OF THE PREFERRED EMBODIMENT

Figure 3:
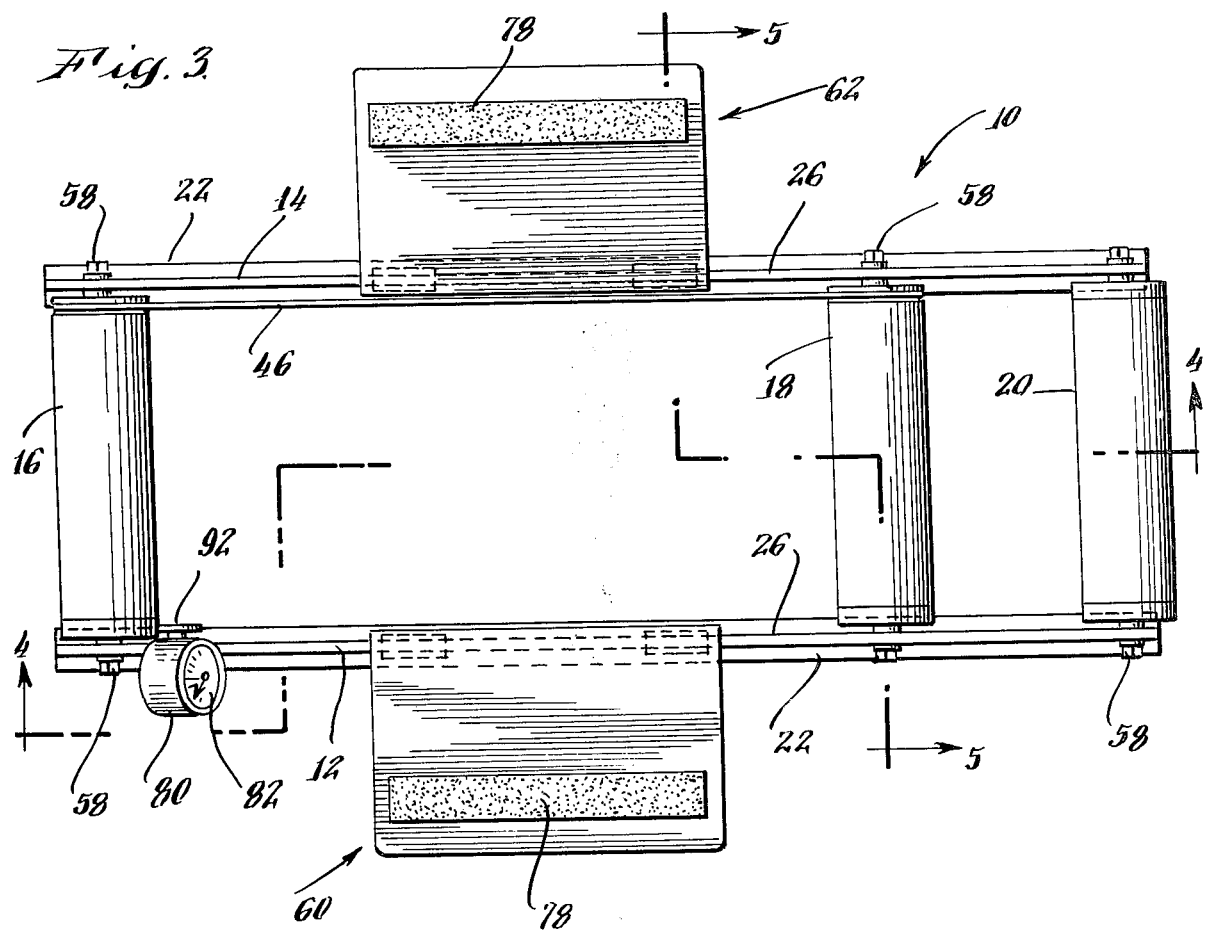
FIG. 3 is a plan view of the bicycle roller system of FIG. 1, omitting illustration of the bicycle.

FIG. 1 illustrates a bicycle roller system 10 constructed in accordance with the present invention and arranged to support a conventional rear wheel drive bicycle B for self-balanced, self-propelled operation by the bicycle operator.

The frame of the bicycle roller system 10 is formed by two side rails 12 and 14 which together mount a front roller 16 arranged to support the front bicycle wheel F, and two rear rollers 18 and 20 arranged to support the rear bicycle wheel R.

As shown in detail in FIG. 5, the side rails 12 and 14, formed for example as aluminum extrusions, have a horizontal bottom flange 22 in contact with the floor or ground G, a central vertical web 24, and an enlarged upper portion 26, essentially rectangular in cross-section, to which the rollers 16, 18, and 20 attach in the manner to be described below.

The construction of roller 18, which is typical of the construction of the other rollers, is shown in FIG. 5. Roller 18 comprises an outer tube 28 upon which a bicycle wheel rides, two end plates 30 and 32 at the ends of the tube 28, a fixed central shaft 34 attached to side rails 12 and 14, and ball bearings 36 and 38 coupling the shaft 34 to end plates 30 and 32. The tube 28 preferably is formed of extruded aluminum, and the end plates 30 and 32 preferably are of machined aluminum, being formed with shoulders 40 to be inserted into press-fitting engagement with the interior of tube 28, and being formed with recesses 42 to receive the outer races of bearings 36 and 38.

One end plate 30 on rear roller 18 is formed with an outer circumferential groove 44 which is adapted to receive a rubber belt 46. The belt 46 is trained over a similarly grooved end plate 30 on roller 16, thereby coupling rear roller 18 with front roller 16 to transmit to front roller 16 and bicycle front wheel F the rotation imparted by the rear bicycle wheel R to rear roller 18.

The fixed central shaft 34 of roller 18 mounts the inner races of bearings 36 and 38 and is arranged to be attached to rails 12 and 14 by means of reduced diameter threaded stub ends 48 and 50 formed on shaft 34. The threaded ends 48 and 50 fit through holes 52 provided in the enlarged upper portion 26 of rails 12 and 14, and are secured there by means of washers 56 and nuts 58. For ease of assembly and dismantling, nuts 58 preferably are wing nuts. Alternatively to providing attachment with threaded ends 48 and 50 and nuts 58, shaft 34 may be secured to rails 12 and 14 by means of bolts (not shown) arranged to fit through rail holes 52 into internally threaded holes (not shown) provided in shaft 34.

Figure 4:
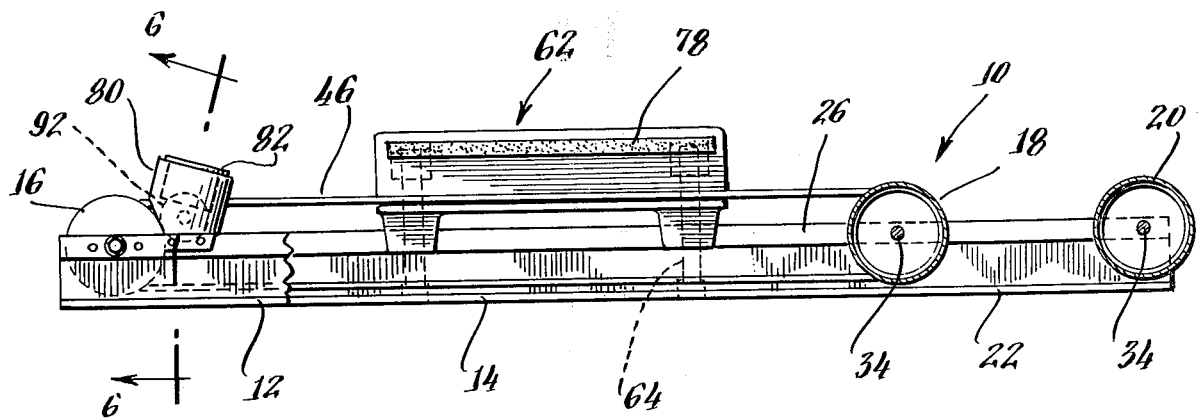

Rails 12 and 14 provide a stable floor-supported base for rollers 16, 18 and 20 and permit the rollers to be attached in a relatively simple manner, thereby facilitating assembly and, if desired, dismantling for storage. In addition, this construction facilitates adjustment of the rollers to match the wheelbase of the bicycle B. Preferably, the front wheel F of bicycle B is either centered over front roller 16 or is positioned just behind this point. To permit front roller 16 to be easily located in this preferred position, side rails 12 and 14 are provided in enlarged portion 26 with a selection of spaced rail holes 52a, 52b, and 52c (FIG. 4) into which shaft end portions 48, 50 of roller 16 may be inserted during assembly.

As indicated previously, the limited inertia developed by the rotating wheels of a stationary bicycle increases the operator's balancing problems. To aid the operation in surmounting these problems in using bicycle roller system 10, as well as in initially learning how to use the system, the present invention provides elevated and inwardly slanted side platforms 60 and 62 detachably mounted on rails 12 and 14 adjacent the pedalling region of bicycle B and positioned to be readily reached by the feet f of the bicycle operator when the bicycle is in an upright operating position.

The platforms 60 and 62 readily permit the bicycle operator to use his feet to provide initial balance and to correct imbalances during operation without outside assistance. Moreover, the platforms allow the operator to change from a foot-supported state to free-standing operation with a minimum of movement on his part, thereby minimizing opportunities for disturbing balance. In addition, the platforms allow the operator to support himself with 1 foot, while starting to pedal with the other foot to develop some stabilizing inertia while remaining in a supported state, thereby facilitating the attainment of balance as operation is started. Finally, the platforms allow safe dismounting when operation is concluded.

Platforms 60, 62 preferably are formed of molded plastic with rectangular flat upper surfaces 74 and lower strengthening ribs 76, and are supported at their inner edges by the rails 12 and 14, and at their outer edges by two tubular vertical legs 64 in contact with the floor or ground G and inserted into corner sockets 66 molded into the platforms (see FIG. 5). Each platform 60 or 62 attaches to its rail 12 or 14 by means of two depending fork structures 68 molded into the platform and forming two vertical slots or channels 70 adapted to receive the upper rail portions 26 in firm frictional engagement. To improve frictional engagement, one vertical wall of slot 70 is provided with an abrasive surface applied in the form of a layer of non-skid tape 72.

Platforms 60 and 62 are mounted on the rails 12 and 14 so as to present flat upper surfaces 74 adjacent the pedals P of bicycle B (see FIGS. 1, 2). The upper surfaces 74 are elevated above the floor to a location extending above the tops of the rollers where they are easily reached by the feet f of the bicycle operator. The platform upper surfaces 74 moreover are slanted inwardly, i.e., downwardly toward the operator, to be approximately at right angles to the operator's outwardly extended leg (FIG. 2), to provide the best balancing support to the bicycle operator. As illustrated in the embodiment shown in the drawings, the platform upper surfaces 74 are slanted at an angle to the horizontal of about 15 degrees to accommodate standard sized bicycles and typical riders. To further improve the foot support provided by platforms 60 and 62, their upper surfaces 74 include an abrasive region applied in the form of a layer of non-skid tape 78 where the operator's feet f contact the platform upper surfaces 74.

The side platforms 60 and 62, constructed as described above, are simple and inexpensive to make, are easily attached to the side rails 12 and 14, and can be detached for storage if desired.

Side rail 12 also mounts an instrument housing 80 which contains an instrument 82, such as a speedometer-odometer, having a drive shaft 84 coupled to a friction wheel 92 in contact with roller 16. The instrument housing 80, preferably made of aluminum, cants rearwardly (FIG. 4) to present the face of instrument 82 to the bicycle operator and is attached to rail 10 in this canted position by means of a fork structure 86 formed on the housing 80 and providing a vertical slot 88 to seat upper portion 26 of rail 12. A setscrew 90 through the wall of fork structure 86 secures the housing to rail 12.

As illustrated in FIG. 6, an outer rubber ring 94 surrounds friction wheel 92 for frictionally engaging roller 16 upon the smooth outer surface of an end plate 30. Friction wheel 92 turns a shaft 96 journalled in housing 80 and terminating in a conical gear 98 meshing with another gear 100 which is coupled to the instrument drive shaft 84, also journalled in housing 80. Accordingly, the rotation of roller 16 will be transmitted to instrument 82 for measurement of the speed and distance travelled by bicycle B, and the appropriate ratio of rotation between the roller 16 and shaft 84 is provided by the sizing of friction wheel 92 and gears 98 and 100.

The instrument housing 80 attaches to rail 12 simply by placing upper rail portion 26 in slot 88 and by tightening setscrew 90 with friction wheel 92 in contact with roller 16. An instrument 82, therefore, may be easily installed at any time, and may be provided as an optional accessory if desired.

Although a specific embodiment of the invention has been disclosed herein in detail, it is to be understood that this is for the purpose of illustrating the invention, and should not be construed as necessarily limiting the invention, since it is apparent that many changes can be made to the disclosed structures by those skilled in the art to suit particular applications.

I claim:

1. A bicycle roller system including a frame, rollers carried by said frame and arranged to support the wheels of a free-standing bicycle to permit the bicycle to be operated in a self-balanced, self-propelled manner thereon, the bicycle roller system being characterized by:

a bicycle mounted on said rollers, said bicycle having pedals which are moveable in a fixed path relative to said bicycle, which path defines a bicycle pedalling region, and side platforms mounted on each side of the frame and presenting upper surfaces adjacent the bicycle pedalling region with portions of the upper surfaces extending above the tops of the rollers approximately to the level of said bicycle pedalling region to be readily reached by the feet of a bicycle operator astride said bicycle mounted on the rollers in an upright operating position, thereby aiding the operator in obtaining and maintaining balanced bicycle operation without another's assistance.

2. A bicycle roller system as claimed in claim 1, wherein the side platforms are mounted in an inclined position with the upper surfaces thereof slanting downwardly toward the center of the frame.

3. A bicycle roller system as claimed in claim 2, wherein the side platforms have their inner edges mounted upon the frame approximately at the height of the tops of the rollers and the platform upper surfaces slant upwardly from the platform inner edges.

4. A bicycle roller system as claimed in claim 2, wherein the platform upper surfaces are slanted at an angle of about 15 degrees to the horizontal.

5. A bicycle roller system as claimed in claim 1, wherein the side platforms have their inner edges mounted upon the frame, and their outer edges supported above their inner edges by means of vertical legs.

6. A bicycle roller system as claimed in claim 1, wherein the frame comprises side rails and wherein the side platforms are detachably mounted to the side rails by means of vertical slots formed in the side platforms and arranged to fit over the rails in frictional engagement.

7. A bicycle roller system as claimed in claim 6, wherein the side platforms each have an abrasive surface in said vertical slots to increase the frictional engagement with the side rails.

8. A bicycle roller system as claimed in claim 6, wherein the side platforms are supported at their outer edges by vertical legs extending upwardly from the floor or ground.

9. A bicycle roller system as claimed in claim 1, wherein the side platforms are mounted in an elevated, inwardly slanted position, having their inner edges attached to the frame, and their outer edges supported by legs.

10. A bicycle roller system as claimed in claim 1 wherein the rollers rotate about shafts and the frame comprises two side rails with apertures for receiving the shafts for mounting the rollers therebetween, the side rails detachably mounting the inner edges of the side platforms and mounting an instrument housing with an instrument therein being rotatably coupled to a roller through a friction wheel carried by the instrument housing.

11. A bicycle roller system as claimed in claim 10, wherein the instrument housing forms a vertical slot arranged to seat a side rail for attachment thereto.

12. A bicycle roller system including a frame, rollers carried by said frame and rotatable about shafts and arranged to support the wheels of a free-standing bicycle to permit the bicycle to be operated in a self-balanced, self-propelled manner thereon, the bicycle roller system being characterized by:

said frame being formed of two side rails;

each side rail having a bottom flange for contact with the floor or ground, a vertical web, and an enlarged upper portion;

the upper portions of the two side rails being apertured to receive the roller shafts for mounting of the rollers therebetween; and an instrument housing mounted upon the enlarged upper portion of one of said side rails near one end thereof, the instrument housing being canted rearwardly to present the face of the instrument in the housing to the bicycle operator and carrying means for transmitting rotation from the roller nearest thereto to the instrument within the housing, the instrument housing being formed with a vertical slot arranged to seat the upper portion of a side rail for attachment thereto.

13. A bicycle roller system including a frame, rollers carried by said frame and arranged to support the wheels of a free-standing bicycle to permit the bicycle to be operated in a self-balanced, self-propelled manner thereon, the bicycle roller system being characterized by:

side platforms mounted on each side of the frame and presenting upper surfaces which would be adjacent the bicycle pedalling region of a bicycle when mounted on the rollers of the bicycle roller system, the side platforms being mounted in an inclined position with the upper surfaces thereof slanting downwardly toward the center of the frame, whereby the side platforms may be reached by the feet of a bicycle operator astride a bicycle, when the bicycle is mounted on the roller system in an upright operating position, thereby aiding the operator in obtaining and maintaining balanced bicycle operation without another's assistance.

14. A bicycle roller system as claimed in claim 13, wherein the side platforms have their inner edges attached to the frame, and their outer edges supported by legs.

15. A bicycle roller system as claimed in claim 14 wherein the frame comprises side rails and wherein the side platforms are detachably mounted to the side rails.

16. A bicycle roller system as claimed in claim 15 wherein the side platforms are detachably mounted to the side rails by means of vertical slots formed in the side platforms and arranged to fit over the rails.

17. A bicycle roller system as claimed in claim 13 wherein the platform upper surfaces are slanted at an angle of about 15° to the horizontal.

* * * * *